United States Patent [19]

Pasquan

[11] Patent Number: 4,715,338

[45] Date of Patent: Dec. 29, 1987

[54] ROTARY ENGINE

[76] Inventor: Raymond F. Pasquan, 131 Parker St., Sarnia, Ontario, N7T6E9, Canada

[21] Appl. No.: 947,890

[22] Filed: Dec. 30, 1986

[51] Int. Cl.[4] .............................................. F02B 53/00
[52] U.S. Cl. ..................................... 123/248; 418/31; 418/251
[58] Field of Search ...................... 123/18 R, 223, 224, 123/225, 226, 237, 248; 418/251, 31

[56] References Cited

U.S. PATENT DOCUMENTS

| | | | |
|---|---|---|---|
| 634,755 | 10/1899 | James | 418/251 |
| 974,803 | 11/1910 | De Lukacsevics. | |
| 1,369,070 | 2/1921 | Williams et al. | 123/248 X |
| 1,828,228 | 10/1931 | Kempton | 123/225 |
| 2,055,137 | 9/1936 | Sherman. | |
| 2,060,937 | 11/1936 | Hinckley et al. | 123/225 |
| 2,744,505 | 5/1956 | Sherman. | |
| 2,762,346 | 9/1956 | White | 123/225 |
| 2,821,176 | 1/1958 | Koser et al.. | |
| 2,938,505 | 5/1960 | Quartier | 123/225 X |
| 3,176,664 | 4/1965 | Kurose | 123/237 |
| 3,912,429 | 10/1975 | Stevenson | 418/251 X |
| 3,913,534 | 10/1975 | Bratten | 123/248 X |
| 3,976,037 | 8/1976 | Hojnowski. | |
| 4,178,900 | 12/1979 | Larson. | |
| 4,446,829 | 5/1984 | Yaeger. | |

FOREIGN PATENT DOCUMENTS

536690  5/1941  United Kingdom ................ 123/248

*Primary Examiner*—Michael Koczo

[57] ABSTRACT

A rotary type internal combustion engine including an outer housing in which a rotor is rotatably mounted, the rotor having at least one pocket formed in the periphery and in which combustion gases expand to drive the rotor. A oscillating member is mounted in an inner circumferential wall of the housing and engages the outer periphery of the rotor and enters the pocket as it passes, the oscillating member being hollow and cooperating with a stationary inner piston to form an expandable combustion chamber into which is admitted a fuel mixture for ignition by ignition means. The oscillating member has an outlet which permits most of the combustion gases to escape from the combustion chamber into the pocket of the rotor to provide a force between the reciprocating member and a leading surface of the pocket for driving the rotor. The presence of the combustion chamber provides for more effective combustion of the fuel mixture by allowing for a better control of the fuel mixture into the combustion chamber and a timed ignition which can be in advance of that which is possible in known rotary engines.

18 Claims, 5 Drawing Figures

FIG.3 ated rotary engine of the present invention. The

ROTARY ENGINE

BACKGROUND OF THE INVENTION

This invention relates to a rotary type internal combustion engine, and more particularly to a novel means for generating and using the combustion gases in a more effective and usable manner.

A known form of the rotary type engine which has developed through the years includes an outer housing or stator which defines a generally cylindrical inner chamber containing a rotor which has an outer peripheral surface rotatably disposed immediately within the inner circumferential surface of the housing. Side edge surfaces of the rotor are disposed adjacent to side walls of the housing so that pockets or cavities in the outer peripheral surface of the rotor, and in which combined air-fuel mixtures are ignited, form enclosures for the expansion of combustion gases. A normal shape of the cavities which extend across the width of the rotor is, in the direction of rotation of the rotor, a steep shoulder extended inwardly from the outer periphery of the rotor and a gradual sloping section which returns to and merges with the outer cylindrical surface of the rotor. The housing is provided with a movable vane mounted in a recess in its inner circumferential surface, which vane is biased toward the peripheral surface of the rotor and enters the cavity as it passes the vane. The vane has a front surface or face which is opposite the shoulder of the cavity so that when the vane is in the cavity a closed chamber is provided between the shoulder and the front face of the vane, the chamber containing the expanding combustion gases which act against the shoulder to drive the rotor. This type of rotary engine is shown in the following U.S. Pat Nos. 974,803, Nov. 8, 1910, to Lukacsevics; 2,055,137, Sept. 22, 1936, to Sherman; 2,744,505, May 8, 1956, to Sherman; and 4,446,829, May 8, 1984, to Yeager.

Attempts have been made to provide a more effective manner of containing the charge of air-fuel mixture prior to ignition and to provide a structure which will direct the products of combustion into the pocket of the rotor. In U.S. Pat. No. 2,821,176, Jan. 28, 1958, to Koser et al, there is shown a rotary internal combustion engine provided with a pivoted fuel charge container which receives the fuel prior to dropping into a cavity of the rotor, and wherein the fuel in the container is ignited after the container has moved into the cavity.

SUMMARY OF THE INVENTION

It is an object of the present invention to provide a rotary engine generally of the type described above but one which is more efficient and capable of producing more power for a given size of engine.

In the rotary engine of the present invention, there is provided, in place of the above described vane, a oscillating means mounted in an opening of inner circumferential surface of the housing, the means including a hollow casing of the width of the rotor and having a rotor engaging surface. A stationary piston member is received within the casing and defines therewith an expandable combustion chamber. The combustion chamber has an inlet valve for admitting a combustible mixture thereinto and an ignition means. A combustion gas outlet means is provided in the casing for communicating combustion gases developed in the combustion chamber into the cavity of the rotor in a direction towards the shoulder of the cavity to thereby produce a force between the oscillating means and the shoulder for driving the rotor.

The structure of the present invention allows a fuel-air mixture to be fed under pressure into the chamber prior to ignition to accomplish better breathing characteristics and permits advance timing of the ignition as can be done in conventional internal combustion engines. These are features which are not present in known types of rotary engines and contribute to a better performing engine.

BRIEF DESCRIPTION OF THE DRAWINGS

In the accompanying drawings, which show one embodiment of the invention, as an example, FIG. 1A-1B is a cross sectional view through the engine as seen from the line 1—1 of FIG. 2;

FIG. 2A-2B is a cross sectional view through the engine as seen from line 2—2 of FIG. 1.

DESCRIPTION OF PREFERRED EMBODIMENT

Figure 1A:
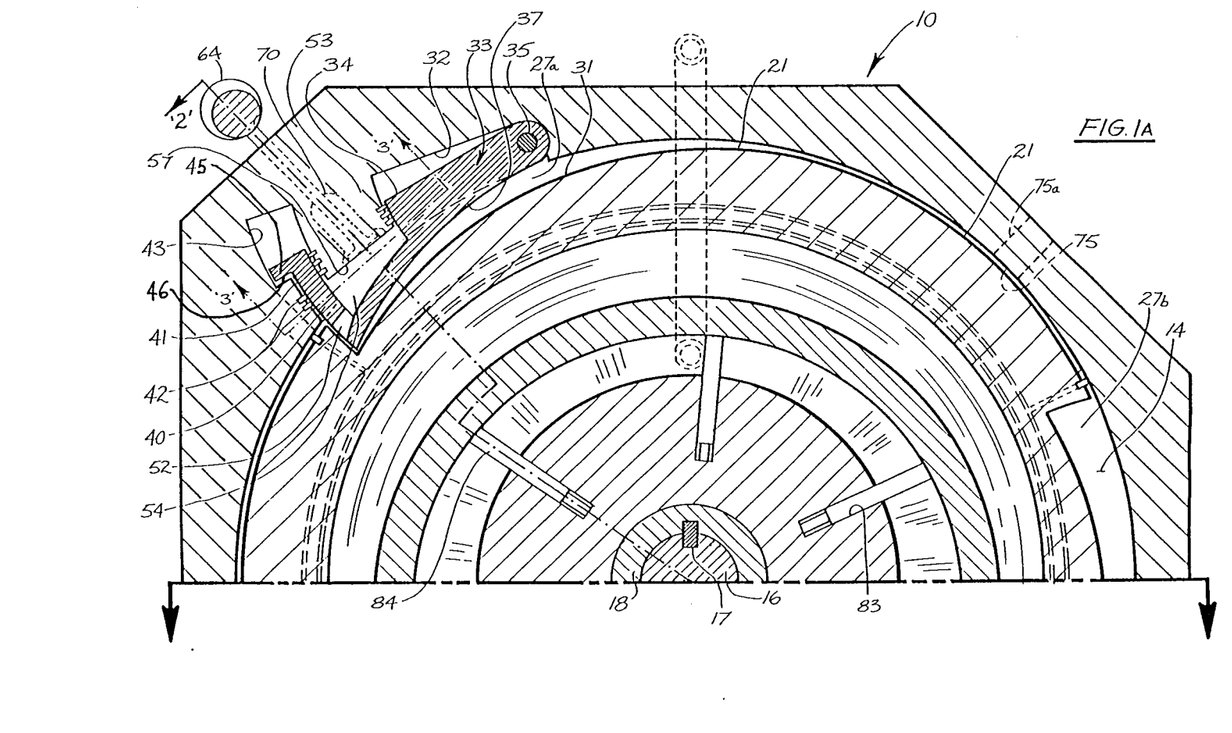
Figure 1B:
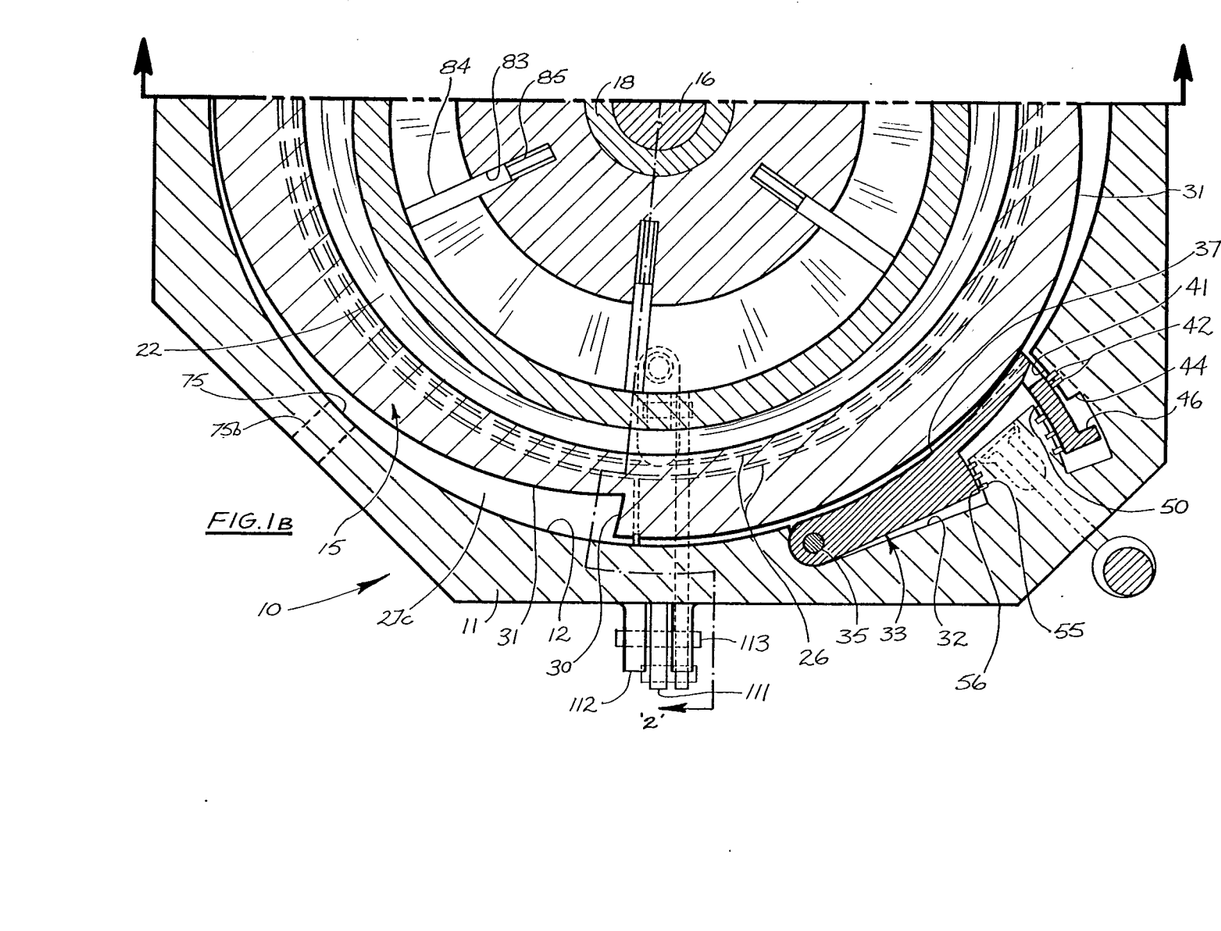
Figure 2A:
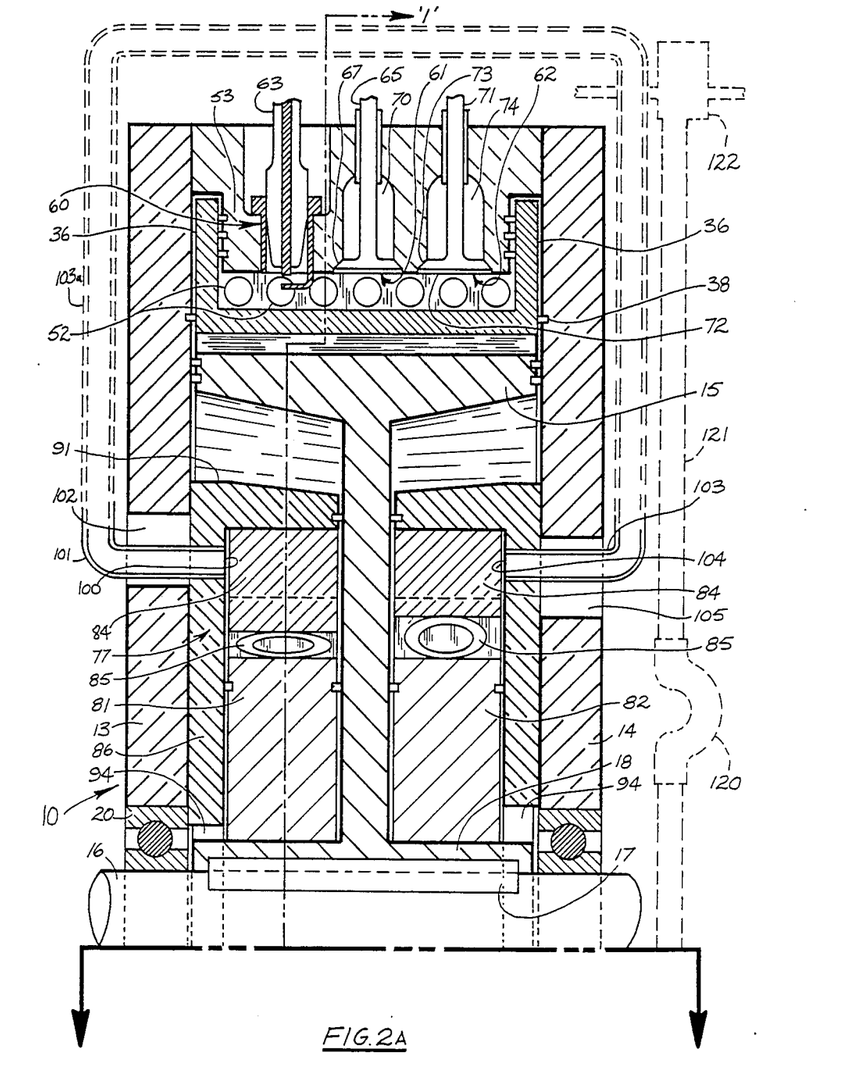
Figure 2B:
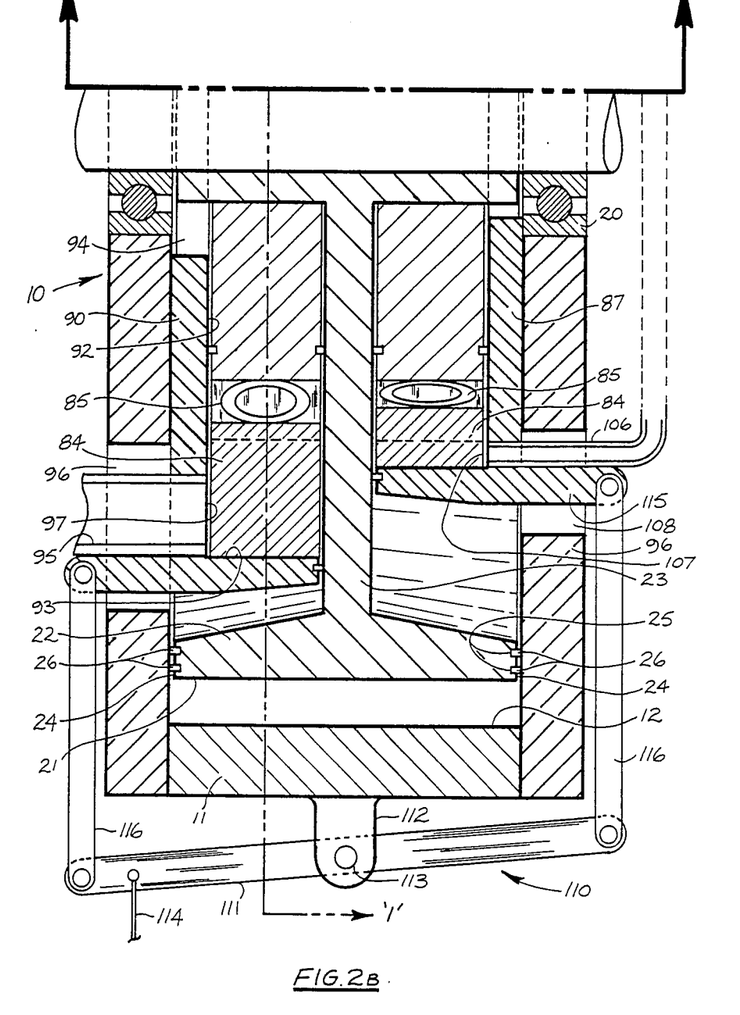

In FIGS. 1 and 2, reference number 10 generally denotes the rotary engine of the present invention. The engine 10 includes an outer stator or housing 11 which defines a generally continuous inner circumferential surface 12 and has a pair of opposed and spaced inwardly extending side walls 13 and 14 (FIG. 2). The inner circumferential surface 12 and side walls 13 and 14 form an internal cylindrical chamber which contains rotor 15 of the engine. The rotor is mounted on an axial output shaft 16 which is centrally disposed and extends transversely through the housing 11. The rotor 15 is fixed for rotation with the shaft by way of a key 17 disposed in a keyway formed in the shaft 16 and a keyway in a hub portion 18 of the rotor. The shaft, and thus the rotor, are mounted for rotation in the housing by way of bearings 20, 20.

The rotor 15 has an overall outside peripheral surface 21 which is cylindrical in shape and of a diameter substantially equal to the inner circumferential surface 12 of the housing 11. Thus, during rotation of the rotor 15 within the housing 11, the peripheral surface 21 of the rotor 15 rotates immediately within the inner circumferential surface of the housing. The peripheral surface 21 is defined on the outer side of a flange 22 of the rotor 15, which flange is connected to hub portion 18 by way of centrally disposed web 23. The width of the flange 22 is only slightly less than the distance between the side walls 13, 14. Along side edges 24, 24 of the flange 22, there are provided grooves 25 which contain seals 26 engaging side walls 13, 14. There are provided in the outer periphery of the rotor 15 pockets or cavities 27 which are shown in the illustrated embodiment as pockets 27a, 27b, and 27c and in the direction of travel of the rotor, are formed with a deeper end which tapers gradually back to the outer periphery of the rotor over about 90°, this being defined by a steep shoulder 30, which may be on a radial plane of the rotor, and a gradual sloping portion 31, which slopes back to the outer peripheral surface and merges therewith.

The housing 11 has diagonally opposed openings 32 in the inner circumferential surface thereof, each of which contains a oscillating means 33. In the embodiment shown in FIGS. 1 and 2, the oscillating means includes a wedge shaped member 34, which is pivotally connected to the housing. The member 34 may be pivotally mounted by the smaller end thereof being received in a similar shaped socket in the inner circumferential surface 12 of the housing as shown in FIG. 1. As an alternative or in addition there may be provide a pivot pin 35 which extends through the member 34 and the side walls 13 and 14. The openings 32 are also wedge shaped to accommodate the member 34 when it is fully retracted as shown at the bottom of FIG. 1. The member 34 is in the full width of the rotor, and walls 13 and 14 are provided with seal means 38 which engage side surfaces 36, 36 of member 34 (FIG. 1). An inner surface 37 of member 34 has a forward portion thereof adapted to engage the outer periphery of the rotor. An outwardly extending wall 40 of the member 34 has an outer surface which is arcuate about the center of pivot of the member 34, which is the center of pivot pin 35. The front wall 41 of opening 32 corresponds in shape to the wall 40 of the member 34, and wall 41 has grooves containing seals 42. Outwardly of wall 41 the opening 32 has a wall 43 on a greater radius than wall 41 so as to provide a shoulder or ledge 44. An outer part of wall 40 of the member 34 is provided with a thickened or flange portion 45 providing a shoulder 46.

Figure 3:
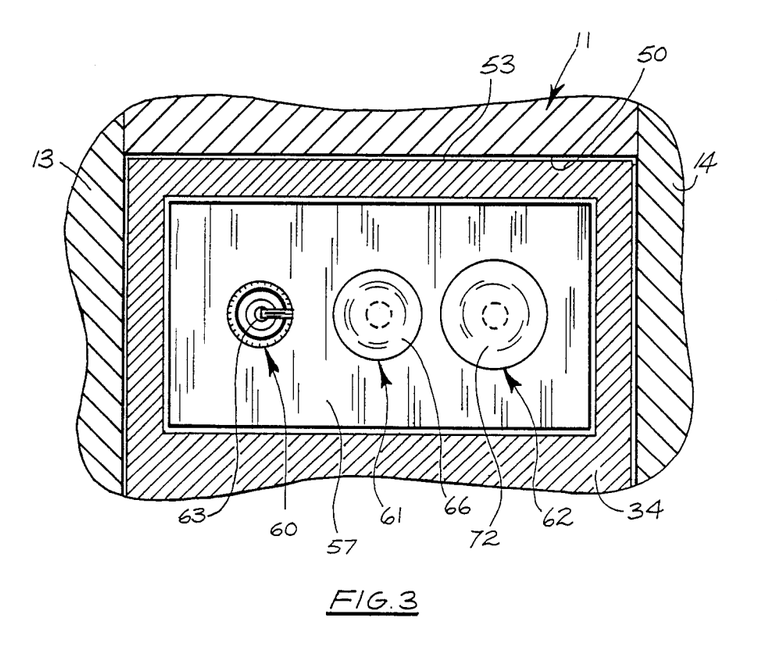
FIG. 3 a is cross sectional view through the reciprocating means as seen from line 3—3 of FIG. 1.

The member 34 has a hollow portion as the walls which provide the inner surface 37, side surfaces 36, 36 and the wall 40 are in the form of a casing which enclose a opentopped cavity 50. In a plane coextensive with the pivot axis of the member, the cavity 50 is rectangular in shape (FIG. 3), and in a plane normal to the pivot axis of the member the cavity is of the shape of an arcuate section of an annular about the axis of pivot of the member. Near the inner wall of the member 34, the wall 40 has a row of apertures 52 therethrough so as to permit communication from the cavity 50 to the pocket 27 when the member 34 is in the inward or extended position, as shown at the top of FIG. 1. Projecting inwardly from the housing 11 in the opening 32 is a stationary piston member 53 having an outer configuration corresponding to that of cavity 50 so that as the member 34 oscillates, or pivots back and forth, the piston member 53, which extends into the chamber 50, forms with cavity 50 an entirely enclosed combustion chamber 54. The piston member 53 has extending around its outer periphery a plurality of grooves 55 containing seals 56 which engage the inner walls of the cavity 50 and prevent the escape of the combustion gases between the piston and the outer walls of the chamber but in effect permit relative oscillation between the piston member and the chamber of the member 34.

In an inner face 57 of the piston member 53, there is provided ignition means 60, an inlet valve means 61 and an outlet valve means 62. The ignition means 60 is shown in the form of a conventional spark plug 63 which receives a high voltage impulse from an ignition timing means (not shown) driven by cam shaft 64 which in turn is driven in timed relation to the shaft 16. Inlet valve means 61 includes a valve member of conventional form, including a valve stem 65 and a valve head 66 which engages a valve seat 67 in the face 57 of the piston member. The valve seat 67 provides an opening which is in communication with a gallery or intake passage 70 of a manifold carrying an air-fuel mixture. Outlet valve means 62 also includes a valve member of conventional form, including a valve stem 71 and a valve head 72 which engages a valve seat 73 in the face 57 of the piston member 53. The valve seat 73 provides an exhaust opening which communicates with an exhaust passage 74 in the housing 11.

While the outlet valve means provide an controlled exit for the combustion gases which remain in the combustion chamber 54 after the termination of the fuel burn period in the combustion chamber, there are additionally provided exhaust means for the exhaust gases which remain in the pockets 27 of the rotor after the combustion gases have completed their expansion therein. These additional exhaust means are in the form of outlet ports 75 located in the the inner circumferential surface of the housing 11, the ports being located in the direction of travel of the rotor about 90° after the oscillating means 33, as shown in FIG. 2, the ports being connected to an exterior exhaust mainfold system (not shown) by exhaust passages 75a and 75b. Accordingly, after the power cycle takes place in each pocket 27 as the pocket passes one of the oscillating means 33, as will be explained in more detail below, the expanded combustion gases remaining in the pocket start to exit from the pocket as the shoulder 30 passes the exhaust port 75 which follows the respective oscillating means 33.

The combustion chamber 54 must be supplied with a compressed combustion mixture, or in the event a fuel injection system is used, air must be supplied under pressure through inlet valve means 61. In the illustrated embodiment of the invention, air compression means 77 is provided within the engine 10. The compressor means 77 includes on opposite sides of web 23 of the rotor, and mounted on hub 18 of the rotor 15, a pair of annular shaped rotor or base members 81 and 82. The members 81 and 82 are disposed immediately against the web and have a thickness which is less than that of the flange 22 of the rotor 15 so that the outer side surfaces thereof are spaced inwardly from the side walls 13 and 14 of the housing 11.

As may best be seen in FIG. 1, each of the compressor hub or base members 81 and 82 are provided with a plurality of radial slots 83, which are circumferentially spaced and extend across the entire thickness of the base members. Contained in each slot 83 is a blade or vane 84 which is in the form of a flat plate which has a length substantially equal to the thickness of its respective base member 81 or 82, a thickness substantially equal to the width of its containing slot 83, and a depth which is considerably greater than the depth of the slot. A spring means 85 is located in each slot 83 beneath the vane 84 for biasing the vane radially outward of the base member 81 or 82. The rotor or base member 81 forms part of a first stage of the air compressor means 77 and rotor or base member 82 forms part of a second stage. The two stages are provide with movable outer or housing members 86 and 87 which are basically cup shaped. Each of the housing members include a flat base 90 with a rim 91 projecting perpendicularily therefrom, the depth of the rim 91 from inner surface 92 of the base 90 being substantially equal to the thickness of the base members 81 and 82. The diameter of an inner surface 93 defined by the rim 91 is greater than the outer diameter of the base member so that a space is provided between the outer surface of the base member and the inner surface 93 of the associated housing member. While the dimensions of the base members 81 and 82 and the associated vanes may be identical, and the shapes of the housings 86 and 87 may be similar, the diameter of the inner surface 93 of the housing 87 of the second stage is less than that of housing 86 of the first stage so that the space between the outer surface of the base member 82 and the inner surface of the housing 87 is less than that of the first stage for reasons which will become apparent below. Alternatively, the diameter of base member 82 could be greater than that of base member 81 to accomplish the same results.

The base 90 of each of the housings 86 and 87 are of a thickness to be accommodated between the side surface of base member of the respective stage of the compressor means and its adjacent outside wall 13 or 14. Whereas the base members 81 and 82 are mounted to rotate with the main rotor 15 of the engine, the housings 86 and 87 are stationary except they are mounted to shift eccentrically relative to the shaft 16, in an upward and downward direction, as view FIG. 2. The base 90 of each housing member is provided with a central opening 94 which is larger than the diameter of the shaft 16 or is elongated so as to allow for such shifting of each housing member. The shifting of the housing members 86 and 87 to different eccentric positions results in different compressed air output, which can thus be utilized to control the engine output as will be described in more detail below.

The main air input for the air compressor means is shown as an inlet conduit 95 which passes through an elongated opening 96 in the side wall 13 of the main housing 11 and is fixed at its inner end to the base of the housing 86, the conduit providing an inlet 97 permitting communication of atmospheric air to the space between the inner surface 92 of the housing and the outer surface of the base member 81 of the first stage of the air compressor means 77. The first stage has an outlet 100 shown in the form of conduit 101 communicating with an opening in the base of the housing 86 at a point adjacent the inner surface 92 of the housing member 86 diametrically opposed to the inlet 97. Conduit 101 extends through an elongated opening 102 in the side wall 13 of the main housing 11, and it is connected, by way of a cross-over conduit 103a, to an inlet conduit 103, which is fastened to the base of housing member 87 so as to provide communication between outlet 100 of the first stage of the compressor means 77 with an inlet 104 of the second stage of the compressor means. Conduit 103 extends through an elongated opening 105 in the side wall 14 of the main housing 11. A final outlet conduit 106 of the compressor means 77 is also connected to the base of the housing 86 at a point diametrically opposed to inlet conduit 102, the outlet conduit 106 communicating with an outlet 107 for the space between the outer peripheral surface of the base member 82 and the inner surface of the rim of the housing 87. The outlet conduit 106 extends through an elongated opening 108 of the side wall 14 of the main housing 11.

The housings 86 and 87 are mounted to be shifted to eccentric positions in an up and down direction as viewed in FIG. 2 and may be provided with a shifting linkage 110 which is capable for moving the two housings in opposite directions simultaneously. In the positions shown in FIG. 2, the two housings are set to produce maximum output wherein the space between the outer periphery of the base members 81 and 82 and the inner surface of their associated housings are at a maximum at the inlets 97 and 104 of the two stages and at a minimum at the outlets. It can be seen, for example, that as housing 86 is moved in a upward direction the compartments between adjacent vanes 84 are smaller as they pass inlet 97 and the amount their sizes decrease as they move to a position adjacent outlet 100 is less so as to produce less pumping effect. The same result is produced as housing 87 is moved in a downward direction. As the two housings approach a concentric position relative to the shaft 16, the pumping effect approaches zero.

The linkage 110 includes a cross member 111 which is pivotally connected to the main housing 11 of the engine by an outwardly extending post 112 on the housing and a pivot pin 113. A control cable 114, which may be accessable to an operator of the engine or is connected to a speed control mechanism such as a governor, is connected to the cross link 111 so as to set its relative position. Each of the housings 86 and 87 have outwardly extending lugs 115 which have connecting links 116 pivotally connected thereto. The opposite ends of links 116 are connected to the outer ends of the cross link 111. It can be seen, therefore, that as cable 114 is pulled to cause the cross link 111 to pivot in a counter clock-wise direction, as viewed in FIG. 2, the link 116 associated with housing 86 pulls housing 86 downwardly, and the link 116 associated with the housing 87 pushes housing 87 upwardly. Such action moves both of the housings 86 and 87 to more eccentric positions, which, as described above, increases the output of the compressor means 77.

Because of the relative movement between the housing members 86 and 87, it is necessary to provide a flexible connection or telescoping means (not shown) between conduit 101 and 103a and between 103a and 103. A similar connection 120 is provided between outlet conduit 106 and a stationary main supply conduit 121 which is connected to a manifold means (not shown) for supplyng the compressed air to the intake passage 71 of each combustion chamber 54. The conduit 121 may include a means which is denoted as 122 for mixing with the compressed air a gaseous fuel, such as propane. Alternatively means 122 may be a carburator system for mixing a liquid fuel with the compressed air.

As an alternative to the compressor means 77, the engine may receive compressed air from another source. Moreover, valving and ignition means may include an entirely different arrangement than shown in FIGS. 2 and 3. As one example, it may be preferrable to locate the spark plug between the intake and exhaust valves. There may also be provided in the piston member 53 a fuel injector means, in which case the inlet valve would admit only compressed air and not an air-fuel mixture. If operated on a Diesel cycle, that which has been termed the ignition means would not be, of course, a spark plug.

In operation, the ignition system is activated before starting if the engine is of a type utilizing a spark plug. The engine is rotated which results in air being compressed by compression means 77, and fuel is mixed with the air in the mixing means 122, thus providing a compressed air-fuel mixture to the passage 71 in the piston means 53. Camshaft 64 is geared or otherwise driven from the main shaft 16 in a timed relation thereto. As the rotor 15 rotates from the position shown in FIG. 1, in a counter clock-wise direction, the oscillating means is pushed outwardly towards its retracted position because of the inner surface 37 of the member 34 riding on the sloping portion 31 of the the pocket 37a inner surface 37. When the member 34 approaches its retracted position, the apertures 52 are closed by the front wall 42 of the opening 32. Upon closing of the outlet or exhaust valve means 62, the inlet valve means reaches its fully open position to allow the compressed fuel-air mixture to enter the combustion chamber 53.

This mixture occupies the space in the cavity 50 between the inner piston 57 and the bottom of the cavity 50, i.e., the combustion chamber 54. Prior to the shoulder 30 of the next pocket 27b reaching the oscillating means 33 shown in the upper right hand corner of FIG. 2, the inlet valve means 61 closes and advanced ignition takes place. Thus, burning of the fuel-air mixture commences prior to the time the shoulder 30 of pocket 27b on the rotor passes the corner between the inner surface 37 and the front wall 40 of the member 34. Accordingly, the forces of the burning gases start to build as the member 34 clears the shoulder 30, and the member 34 is therefore forced inwardly. The inner rotor engaging surface therefor moves quickly towards the sloping portion 31 in the pocket 27b. The distance between the inner surface 37 and the shoulder 46 provided by the flange 45 in relation to the depth of the shoulder 30 is such that an oil supply which is present in the space between the shoulder 46 and the shoulder or ledge 44 acts as a cushion as the rotor engaging inner surface of the member approached the sloping portion of the rotor 15. The cushion provided by the oil prevents a shock as the member 34 re-engages the rotor.

As the oscillating means moves to its extended or inner position, the apertures are exposed so that the expanding combustion gases escape from the combustion chamber and into the pocket 27b. The pressure which continues to develope in the combustion chamber maintain the inner surface 37 of the member 34 in contact with the sloping portion 34 of the rotor so that the member seals the space between the front wall 40 thereof and the shoulder 30 of the pocket 27b. Accordingly, in the closed pocket 27b, the gases issuing from the apertures 52 occupy the space, and the wall 40 which acts as reactionary surface for the gases which apply a force against the shoulder 30. Forces are thereby developed against the shoulder 30 to rotate the rotor in the counter clock-wise direction and as that happens the engine can proceed to operate on its own; each time one of the pockets passes one of the oscillating means 33, a power stroke is effected. Thus, each time the shaft 16 rotates one revolution, the engine experiences six power strokes because of there being three pockets and two oscillating means 34. It would be possible, of course to utilize a different number of pockets and a different number of oscillating means for each rotor, and any number of rotors can be used in an axially adjacent relationship for a more powerful yet compact engine.

As the rotor 15 continues to rotate and the combustion gases issue from the combustion chamber 54, the inner surface 37 continues to ride up the sloping portion 31 of the pocket 27b which pushes the member 34 outwardly towards its retracted position and this action expels most of the remaining combustion gases from the combustion chamber 54 into the pocket 27b. Eventually, the apertures 52 are closed by wall 43 of the opening 32 of the housing 11. By that time, the shoulder 30 moves past the exhaust port 75 in the housing 11 so that it is exposed to the pocket, the port 75 following the oscillating means 33 by about 90° for the arrangement shown. This permits the gases within pocket 27b to escape. Also at the time of, or slightly before, the closing of the apertures 52, the opening of exhaust valve means 62 is initiated to permit the burnt gases within the combustion chamber 54 to exit before the new fuel-air mixture enters on opening of inlet valve means 61, following which the above cycle is repeated as pocket 27c passes the reciprocating means 33.

During the above-described operation the compressor means 77 continues to supply compressed air and the power output of the engine may be controlled by adjustment of the settings of the compressor housing members 86 and 87.

It can be recognized that the above described arrangement including the oscillating means which contains a separate combustion chamber allows for a stronger and more efficient power stroke than is possible in the known type of rotary engines because it is possible to provide a compressed charge of air in the combustion chamber prior to ignition and to utilize an advanced ignition system. Also, by incorporating the compressor means within the space occupied by the rotor a very compact engine can be provided.

Alternatives to the above-described embodiment will be apparent those skilled in the art without departing from the spirit of the invention as defined in the appending claims.

What is claimed is:

1. In a rotary internal combustion engine of the type including a housing having a generally continuous inner circumferential surface, and a pair of opposed inwardly extending side walls, a rotor rotatably mounted within said housing and having an external generally peripheral surface in close proximity to the inner circumferential surface of said housing and side edge surfaces adjacent said side walls, at least one power producing pocket in the outer peripheral surface of the rotor and extending thereacross, the pocket being defined in the direction of rotation of the rotor by a steep shoulder extending inwardly from the outer peripheral surface and a gradual sloping section returning to the outer peripheral surface and merging therewith, the improvement comprising a oscillating means mounted in an opening in said inner circumferential surface of said housing, said oscillating means including a movable member having the width of said rotor and having a rotor engaging inner surface, said movable member having an outwardly open cavity formed therein and receiving a stationary piston member, said movable member and piston member defining an expandable combustion chamber within said member, said combustion chamber having an inlet valve for the admission of a pressurized combustible gas, an ignition means, and outlet means for communicating combustion gases developed in said combustion chamber into said power pocket to thereby produce a force between said oscillating means and said shoulder for driving said rotor.

2. A rotary engine as defined in claim 1, wherein said movable member is connected to said housing by way of a pivot connection providing a pivot axis parallel to the axis of rotation of the rotor.

3. A rotary engine as defined in claim 2 wherein said rotor engaging surface of said movable member trails said pivot connection in the direction of rotation of said rotor, and said movable member has a wall extending outwardly from said rotor engaging surface and defining said outlet means for expelling combustion gases from said combustion chamber to said power pocket as said movable member moves inwardly towards said rotor from a retracted position within said housing.

4. A rotary engine as defined in claim 3, wherein said open cavity in said movable member is immediately adjacent said outwardly extending wall and in a plane normal to the pivot axis of said movable member, said cavity being of the shape of an arcuate section about said pivot axis, said stationary piston being of a shape corresponding to that of the cavity so as to be oscillatingly received therein.

5. A rotary engine as defined in claim 3, wherein the outer surface of said outwardly extending wall is arcuate about said pivot axis in cross section in a plane normal to said pivot axis, and wherein said opening in the inner circumferential surface of said housing has a front wall corresponding in shape to the arcuate surface of the outer wall of the movable member and being in immediate juxtaposed relation so as to seal said outlet means when said movable member returns to the retracted position.

6. A rotary engine as defined in claim 5, wherein the front wall of said opening has a recessed portion providing a ledge, and said outwardly extending wall of said movable member has a flange projecting therefrom, said flange being spaced from said rotor engaging surface of said movable member a distance to permit said flange to interact with said ledge to assist in the termination of the inward movement of said movable member prior to said rotor engaging surface initially contacting said gradually sloping section of said power pocket.

7. A rotary engine as defined in claim 5, wherein said piston member has an inner end surface and said cavity has a bottom surface, said combustion chamber being defined by a space between said inner end surface and said bottom surface, said inlet valve being provided in said inner end surface.

8. A rotary engine as defined in claim 7, wherein said inlet valve includes a valve seat formed in said inner end surface and a valve member reciprocably mounted in said piston member and cooperating with said valve seat for closing said inlet valve in one position and allowing free passage of the fuel mixture into said combustion chamber in another position, said valve member having externally driven means for providing timed actuation of said valve member.

9. A rotary engine as defined in claim 7, and including an exhaust valve means in said inner surface of said piston member for allowing an exit for combustion gases from said combustion chamber after closure of said outlet means.

10. A rotary engine as defined in claim 9, wherein said exhaust valve means includes a valve seat in said inner surface of said piston member and a valve member reciprocably mounted in said piston member, said member cooperating with said valve seat to close said exhaust valve in one position and being movable to an open position, said valve member being actuated externally by a cam means.

11. A rotary engine as defined in claim 7, wherein said ignition means includes a spark plug in a threaded bore in said piston member.

12. A rotary engine as defined in claim 1, and further including exhaust outlet ports for said pocket of said rotor, said ports being in said housing being located a distance in the direction of travel of said rotor sufficient to permit the completion of communication of said combustion gases from said combustion chamber and into said pocket prior to exhausting through said outlet ports.

13. In a rotary internal combustion engine of the type including a housing having a generally continuous inner circumferential surface, and a pair of inwardly extending side walls, a rotor rotatably mounted within said housing and having an external generally peripheral surface in close proximity to the inner circumferential surface of said housing and side edge surfaces adjacent said side walls, at least one power pocket in the outer peripheral surface of the rotor and extending thereacross, the pocket being defined in the direction of rotation of the rotor by a steep shoulder extending inwardly from the outer peripheral surface and a gradual sloping section returning to the outer peripheral surface and merging therewith, the improvement of a oscillating member having an internal cavity cooperating with a stationary piston member to form therebetween an expandable combustion chamber, said oscillating member being engagable with the peripheral surface of said rotor and defining with the power pocket an enclosure arranged to receive combustion gases from said combustion chamber for driving said rotor, said combustion chamber having an inlet valve means for admitting at least compressed air to said combustion chamber, said rotor having means driving a compressor means for supplying compressed air to said inlet valve means.

14. A rotary engine as defined in claim 13, wherein said rotor has a central hollow portion defined by an annular outer flange defining the peripheral surface, said compressor means being disposed in said hollow portion.

15. A rotary engine as defined in claim 14, wherein said outer flange is mounted on a central radial web of said rotor, said compressor being a two stage compressor, a first stage of said compressor being mounted on one side of said web and a second stage mounted on the other side of the web.

16. A rotary engine as defined in claim 15, wherein each stage of said compressor includes a hub portion having a plurality of radially extending slots, an outwardly biased vane in each slot, a housing enclosing the vanes and having an inner circumferential surface engageable with outer edges of said vanes for defining with said hub portion and said vanes a plurality of enclosed compartments, said housing having an inlet and an outlet, said compartments revolving about said hub portion between said inlet and said outlet on rotation of said housing relative to said hub portion, and means for moving said housing to a position eccentric to said hub portion to vary the output of said compressor.

17. A rotary engine as defined in claim 16, wherein linkage means is provided to simultaneously shift the housings of both stages.

18. A rotary engine as defined in claim 15, and including an output conduit connected to the output of the second stage of said compressor means for conducting compressed air to a means for mixing a fuel with said compressed air, and means for conducting the mixture produced by said means to said inlet valve means.

* * * * *